(12) United States Patent
Schroedel et al.

(10) Patent No.: US 12,103,340 B2
(45) Date of Patent: Oct. 1, 2024

(54) MONITORING DEVICE FOR A VEHICLE, WARNING DEVICE FOR A VEHICLE, WARNING SYSTEM AND METHOD FOR OPERATING A MONITORING DEVICE

(71) Applicant: Helmut Schroedel, Planegg (DE)

(72) Inventors: Helmut Schroedel, Planegg (DE); David Wayne Larsen, Roleystone (AU); Mercurio Cicchini, Roleystone (AU)

(73) Assignee: Helmut Schroedel, Planegg (DE)

( * ) Notice: Subject to any disclaimer, the term of this patent is extended or adjusted under 35 U.S.C. 154(b) by 348 days.

(21) Appl. No.: 17/762,785

(22) PCT Filed: Sep. 17, 2020

(86) PCT No.: PCT/EP2020/000160
§ 371 (c)(1),
(2) Date: Mar. 23, 2022

(87) PCT Pub. No.: WO2021/063533
PCT Pub. Date: Apr. 8, 2021

(65) Prior Publication Data
US 2022/0339978 A1    Oct. 27, 2022

(30) Foreign Application Priority Data

Oct. 1, 2019   (DE) .................... 10 2019 006 859.9
Aug. 4, 2020   (DE) .................... 10 2020 004 720.3

(51) Int. Cl.
*B60C 23/04*     (2006.01)
*B60C 23/20*     (2006.01)
*B60Q 9/00*      (2006.01)

(52) U.S. Cl.
CPC ........ *B60C 23/0498* (2013.01); *B60C 23/041* (2013.01); *B60C 23/20* (2013.01); *B60Q 9/00* (2013.01)

(58) Field of Classification Search
CPC ... B60C 23/0498; B60C 23/041; B60C 23/20; B60C 23/008; B60C 23/0401; B60Q 9/00
See application file for complete search history.

(56) References Cited

U.S. PATENT DOCUMENTS 4,619,137 A * 10/1986 Bott .................. B60C 23/00318
                                                  73/146.5
5,090,237 A *  2/1992 Schrumpf ........... B60C 23/0498
                                                  73/756
(Continued)

FOREIGN PATENT DOCUMENTS

DE     102007045109 A1    4/2009
DE     102014205925 A1   10/2015
(Continued)

*Primary Examiner* — Mussa A Shaawat
(74) *Attorney, Agent, or Firm* — Smartpat PLC

(57) ABSTRACT

The approach presented here relates to a monitoring device (100) for a vehicle. The monitoring device (100) has at least one measuring device (105) with a sensor unit (110) and a transmitter unit (115). The sensor unit (110) is designed to sense a physical parameter in the area of the wheel in a coupled position on a first section of a wheel hub (120) of a wheel of the vehicle while the vehicle is moving. The transmitter unit (115) has a fastening device which is shaped in order to fasten the transmitter unit (115) in a fastening position on a second section of the wheel hub (120) of the wheel or on a wheel rim (122), the transmitter unit (115) is designed to wirelessly send a sensor signal (125) representing the physical parameter to a warning device in order to enable monitoring of the physical parameter.

13 Claims, 8 Drawing Sheets

(56) References Cited

U.S. PATENT DOCUMENTS

| | | | |
|---|---|---|---|
| 6,034,596 | A | 3/2000 | Smith et al. |
| 6,518,877 | B1 | 2/2003 | Starkey et al. |
| 2002/0130771 | A1 | 9/2002 | Osborne et al. |
| 2006/0061463 | A1 | 3/2006 | Wilson |
| 2009/0179748 | A1 | 7/2009 | Stephen et al. |
| 2014/0007666 | A1* | 1/2014 | Kutzscher ........... B60C 23/0498 73/146.5 |
| 2014/0309860 | A1 | 10/2014 | Paulin et al. |
| 2017/0259631 | A1* | 9/2017 | Lesesky ................ F16F 15/363 |
| 2019/0061441 | A1* | 2/2019 | Boutru .................. B62J 43/30 |
| 2020/0023684 | A1* | 1/2020 | Osawa ................ B60C 23/0494 |
| 2020/0122529 | A1* | 4/2020 | Skjermo ............. B60C 23/0479 |
| 2020/0346499 | A1* | 11/2020 | Tritschler .......... B60C 23/00327 |
| 2021/0016526 | A1* | 1/2021 | Marino .................... B29C 73/22 |
| 2022/0041020 | A1* | 2/2022 | Kempf ................ B60C 23/0408 |
| 2022/0283016 | A1* | 9/2022 | Bunner ..................... G01L 5/16 |

FOREIGN PATENT DOCUMENTS

| | | |
|---|---|---|
| EP | 1262339 A1 | 12/2002 |
| WO | 2014056078 A1 | 4/2014 |

* cited by examiner

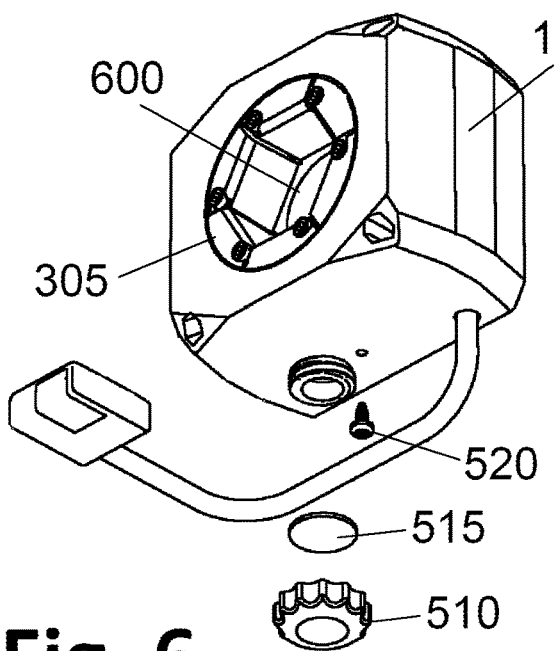
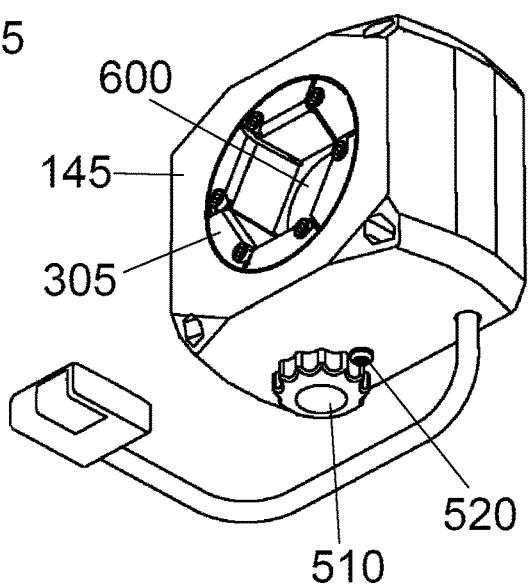
Fig. 6  Fig. 6a
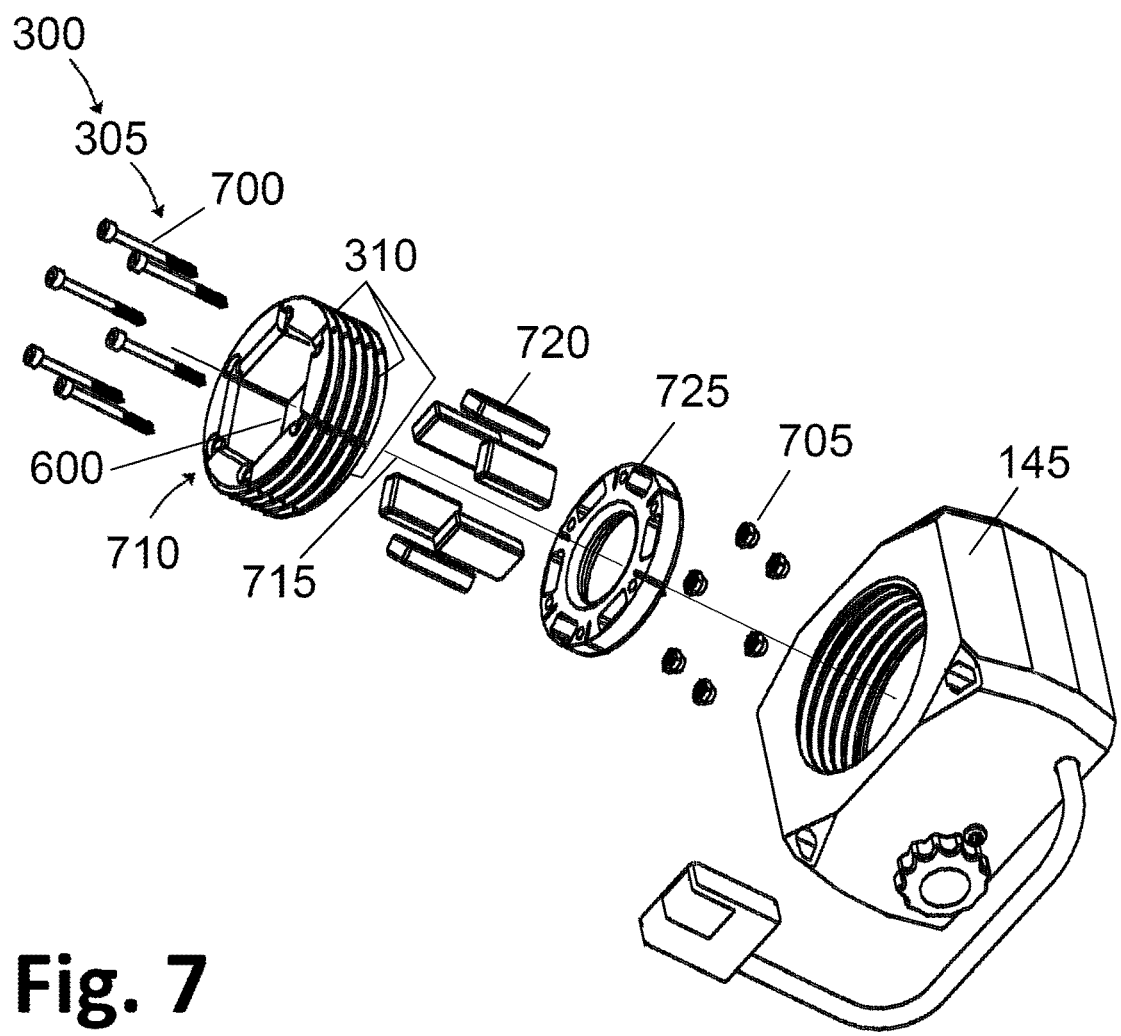
Fig. 7

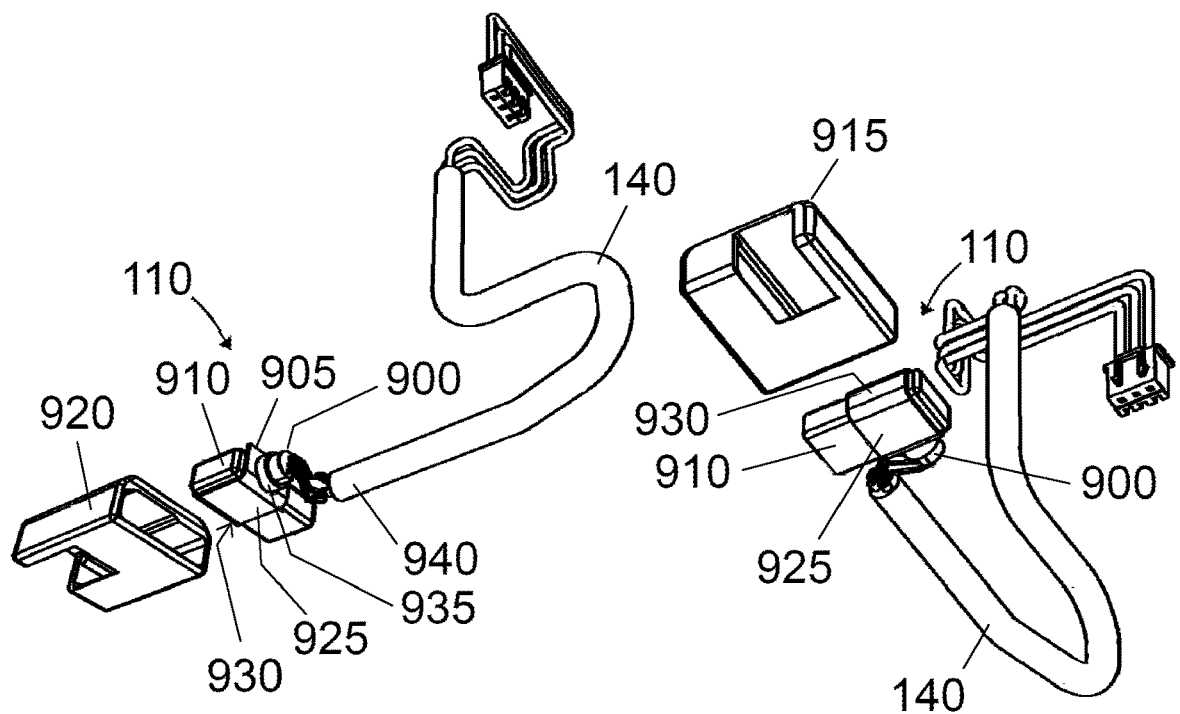
Fig. 9
Fig. 9a
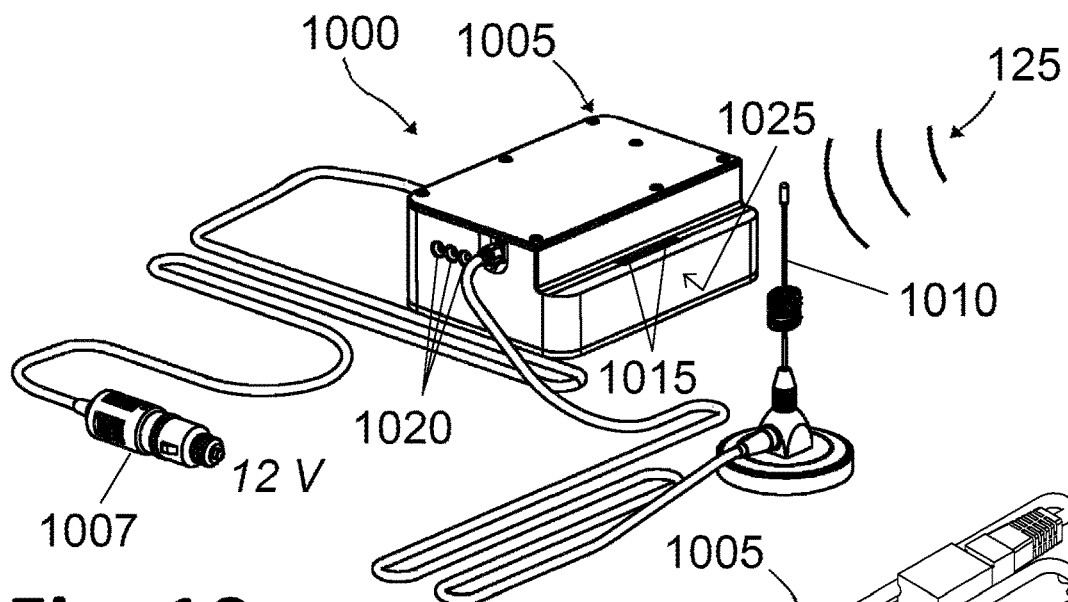
Fig. 10
Fig. 10a

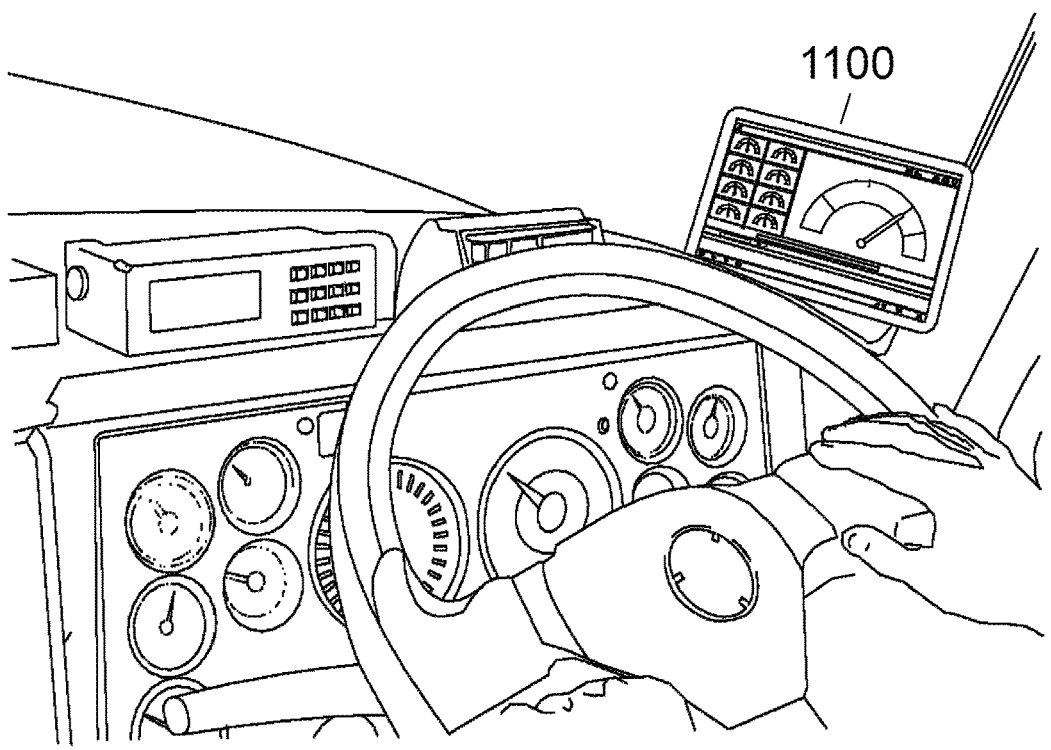
Fig. 11
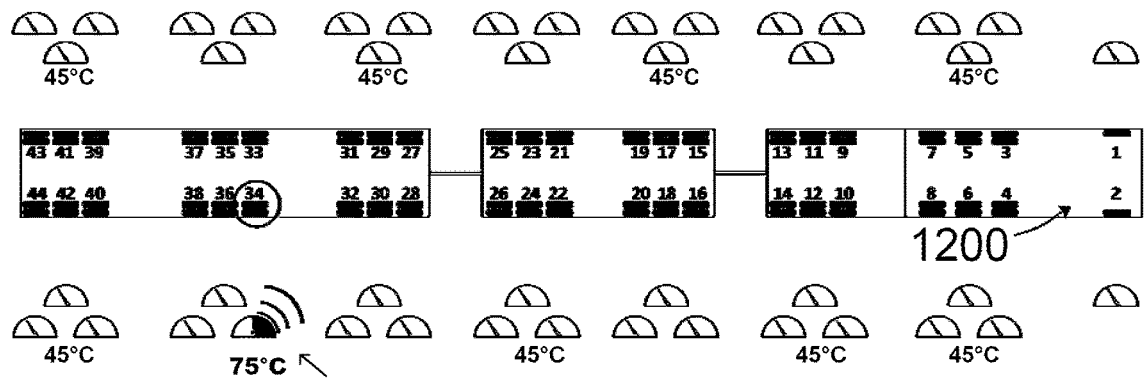
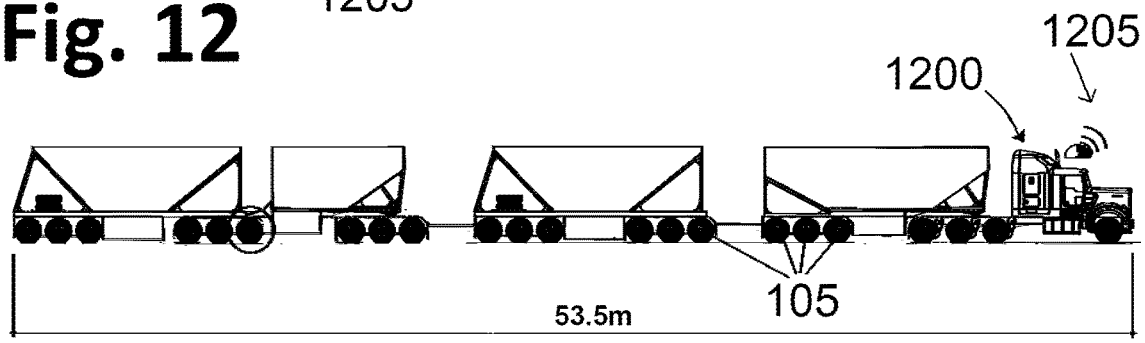
Fig. 12
Fig. 12a

MONITORING DEVICE FOR A VEHICLE, WARNING DEVICE FOR A VEHICLE, WARNING SYSTEM AND METHOD FOR OPERATING A MONITORING DEVICE

TECHNICAL FIELD

The disclosure relates to a device and a method for monitoring a vehicle, and more specifically a device for monitoring axles or wheels of a vehicle.

BACKGROUND

Monitoring of axle or wheel properties is often problematic in road trains, in particular where undetected overheating of a wheel or axle endangers the operation of the vehicle or can even cause a vehicle fire, resulting in the destruction of the entire vehicle train.

SUMMARY

Against this background, a monitoring device for a vehicle, a warning device for a vehicle, a warning system, a method for operating a monitoring device and finally a corresponding computer program according to the main claims are presented with the approach presented here. Advantageous developments and improvements of the device specified in the independent claim are possible as a result of the measures listed in the dependent claims.

The advantages that can be achieved with the approach presented are that a possibility is created to increase vehicle safety for a vehicle and/or a vehicle driver of the vehicle by monitoring a physical parameter prevailing on the vehicle. A monitoring device presented for this purpose can be attached permanently to the vehicle quickly and easily, but can also be easily detached again.

A monitoring device for a vehicle is presented. The monitoring device has at least one measuring device with a sensor unit and a transmitter unit. The sensor unit is designed to sense a physical parameter in the area of the wheel in a coupled position on a first section of a wheel hub of a wheel of the vehicle while the vehicle is moving. The transmitter unit has a fastening device that is shaped to fasten the transmitter unit in a fastening position to a second section of the wheel hub of the wheel or to a wheel rim, with the transmitter unit being designed to wirelessly send a sensor signal representing the physical parameter to a warning device send to enable monitoring of the physical parameter.

The monitoring device can be used, for example, for vehicles such prime movers with, for example, several trailers and a large number of wheels, the so-called "road trains", which often travel long distances at potentially high ambient outside temperatures. Such road trains are usually only manned by one vehicle driver, hereinafter also referred to as "vehicle driver", and safety checks are therefore tedious, time-consuming and ineffective in order to detect a tire fire due to sudden technical failure in good time despite a safety check.

The monitoring device presented here now advantageously enables automated monitoring of a physical parameter in the area of the wheel of the vehicle while driving. The first section can be a hub shell of the wheel hub, for example. The hub sleeve can be used to pass through a vehicle axle of the vehicle. Positioning the sensor unit on the hub shell makes it possible to sense the physical parameter at a point on the vehicle where, for example, high temperatures can occur during long journeys The second section can be, for example, a hub flange of the wheel hub, which extends radially from the hub shell. Alternatively, the transmitter unit can be fastened or fastenable to the wheel rim, which can be coupled or can be coupled to the wheel hub. Both the hub shell and the hub flange and the wheel rim are easily accessible for a vehicle driver and the monitoring device can therefore be installed quickly and easily. The warning device can be understood as a receiving device that is or can be arranged in a driver's cab of the vehicle, which here offers the possibility of being able to monitor the physical parameter for the vehicle driver while driving after receiving the sensor signal. For example, the transmission unit can be designed to transmit the sensor signal by radio, ie as a radio signal, to the warning device. In this case, the transmission unit can be designed, for example, to send the sensor signal to the warning device at a defined time interval, for example every minute, in order to always provide up-to-date physical parameters According to one embodiment, the transmission unit and the sensor unit can be arranged in different housings and/or can be connected to one another or formed so that they can be connected via a flexible connection cable for the transmission of the physical parameter. This allows the transmitter unit and sensor unit to be positioned at different points that are advantageous for their function. Additionally or alternatively, the transmission unit and/or the sensor unit can also be arranged in a gas-tight and/or explosion-proof housing. In the present case, an explosion-proof housing can be understood to mean a housing that is designed to be gastight, so that, for example, a combustible gas cannot penetrate into the housing and cannot be ignited by components of the transmission unit and/or the sensor unit. In this way, the monitoring device can also be used specifically on dangerous goods transport vehicles, where any flammable liquids or vapors that may occur during loading or unloading of the dangerous goods transport vehicle can escape, which may then ignite through the transmitter unit and/or the sensor unit or cause an explosion.

The attachment device of the transmitter unit can have a recess which is formed for positive attachment of the transmitter unit to a wheel nut of the wheel hub of the wheel. The wheel nut can be arranged on the hub flange of the wheel hub and can be used, for example, to connect the wheel hub to the wheel rim. The recess can be shaped in the form of a hexagonal socket for ideal, form-fitting accommodation on the wheel nut. Such a fastening to the wheel nut enables the transmitter unit to be mounted on a large number of different wheels, since the wheel nuts are structurally identical in a large number of motor vehicles.

According to one embodiment, at least one area of the fastening device can additionally or alternatively be formed magnetically in order to magnetically fasten the transmitter unit to the second section or to the wheel rim or wheel nut and/or the fastening device can have a clamping device which is designed to hold the transmitter unit to clamp to the second section or the wheel rim or wheel nut. Furthermore, a magnetic and/or non-positive connection can be realized between the transmitter unit and the wheel in order to increase the stability of the transmitter unit on the wheel. For example, the recess/hexagon socket can be formed magnetically so that it is magnetically pulled into a correct position over the wheel nut during assembly for particularly simple assembly. The clamping device can be shaped in order to cause the hexagon socket to be clamped to the six side surfaces of the wheel nut after a rotary movement of the transmitter unit on the wheel nut.

According to one embodiment, the clamping device can have one or more, for example six, movable clamping claws. The clamping claws together can form the hexagon socket. The clamping device can be screwed or can be screwed into a housing of the transmission unit via an external thread. According to one embodiment, the clamping device can have a cylindrical external thread in a state of rest when the wheel nut is not received in the hexagonal socket, in particular wherein the external thread can be conically deformed when the wheel nut is received in the hexagonal socket.

It is also advantageous if the transmission unit is designed according to one embodiment to send the sensor signal to the warning device with a transmission power of more than 100 mW and/or has a repeater to amplify the sensor signal and/or forward a second sensor signal. The repeater can be used, for example, to amplify and/or forward the received second sensor signal from a second measuring device structurally corresponding to the measuring device, which, for example, can be further away from the warning device than the measuring device. A transmission power of more than 100 mW enables a range of more than 100 meters to also be able to monitor the wheels of very long articulated lorries with many trailers.

The transmission unit can also be designed to send the sensor signal, which includes identification information that identifies the measuring device from a other measuring device allows, and/or includes a state of charge information of an energy storage device of the measuring device. The identification information enables the physical parameter transmitted by the sensor signal to be assigned to the corresponding wheel. The state of charge information can indicate the state of charge of the energy storage device, for example to enable early charging when the state of charge is low.

According to one embodiment, the measuring device can have a solar module that is designed to charge an energy storage device of the measuring device using solar energy in order to provide supply energy for operating the measuring device, and/or have a plug connection for external charging of the energy storage device. The energy storage device can include at least one accumulator. The solar module and/or the plug connection can be arranged on or in the transmission unit. In this way, the supply energy can be provided particularly practically and without charging stops by solar radiation, or the energy storage device can be charged by a person via the plug-in connection if, for example, the sun is not shining enough. This can enable a secure power supply for the measuring device.

The sensor unit may have at least one magnet configured to magnetically couple the sensor unit to the wheel hub of the wheel. For example, the sensor unit can be magnetically coupled to the hub shell quickly and easily. This allows easy assembly for one person. The magnet can be a neodymium magnet.

It is also advantageous if the sensor unit has a temperature probe which is designed to sense a temperature as the physical parameter and/or has a pressure sensor to sense a tire pressure as the physical parameter. Knowledge of the tire pressure can be used to prevent a safety-critically low or safety-critically high tire pressure or to determine the temperature using the tire pressure. The temperature probe can have a temperature sensor connected to a copper sheet. The copper sheet can protrude into the area to be sensed, for example by contacting the hub sleeve in order to record the temperature prevailing there with particularly low losses and to be able to transmit it to the temperature sensor. Knowledge of the temperature can be used to identify or prevent a safety-critical high temperature, which could, for example, cause an imminent fire on an axle of the vehicle.

According to one embodiment, the monitoring device can have at least one second measuring device with a second sensor unit, which is designed to measure a second physical parameter in the area of the second wheel in a coupling position on a first section of a wheel hub of a second wheel of the vehicle while the vehicle is moving sense, and with a second transmitter unit, which has a second fastening device which is shaped in order to fasten the second transmitter unit in a fastening position on a second section of the wheel hub or a second wheel rim of the second wheel, with the second transmitter unit being designed to wirelessly transmit a second sensor signal representative of the second physical parameter to the warning device to enable monitoring of the second physical parameter. Thanks to several such measuring devices of identical construction, for example, physical parameters can be sensed and monitored on several wheels. The monitoring device can have any number of other such measuring devices, which can depend on the number of wheels on the vehicle. The monitoring device can ideally have an associated measuring device for each wheel of the vehicle.

A warning device for a vehicle is also presented, the warning device being designed to read in the sensor signal of a monitoring device in one of the variants described above and, using the sensor signal, to produce an optical, acoustic and/or haptic output of the physical parameter on an output unit. The output can be used to inform the operator of the vehicle of the physical parameter. The output unit can have a display, loudspeaker and/or mobile device, for example a device capable of vibration. The output unit can be part of the warning device or a communication device already present in the vehicle. To receive the sensor signal, the warning device can have a receiving device in the form of an antenna. The warning device can also be designed to bring about an optical, acoustic and/or haptic output of the second physical parameter on the output unit using the second sensor signal. Correspondingly, the warning device can be designed to bring about an optical, acoustic and/or haptic output of the further physical parameters assigned to them on the output unit using any number of further sensor signals from further measuring devices of the monitoring device. In this way, the physical parameter of several or all wheels of the vehicle can be monitored by the vehicle driver while driving.

It is also advantageous if the warning device is designed according to one embodiment to generate a warning signal when the physical parameter reaches or exceeds a defined threshold value. The defined threshold value can represent a maximum temperature of, for example, 75° C. at the wheel hub. The warning signal can be designed to cause an acoustically, visually and/or haptically perceptible warning for a person on the output unit, for example. Furthermore, according to one embodiment, the warning device can be designed to generate a further warning signal when the charge status information reaches or falls below a defined charge status threshold value, wherein the defined charge status threshold value can represent a low battery level or a battery level that needs to be charged, for example 20 percent of the charging capacity of the energy storage device. This can ensure that the driver of the vehicle is made aware of an increased temperature at a wheel hub and/or an impending switch-off of the monitoring device due to a lack of supply energy.

A warning system is also presented which has one of the monitoring devices presented above and one of the warning devices presented above. Such a warning system advantageously offers the possibility of comprehensive monitoring of a physical parameter, for example a temperature, on at least one wheel of the vehicle, with the parameter being output to the vehicle driver.

A method for operating a monitoring device in one of the variants described above comprises a sensing step and a sending step. In the sensing step, the physical parameter in the area of the wheel is sensed using the sensor unit in the coupled position on the first section of the wheel hub of the wheel of the vehicle while the vehicle is moving. In the sending step, a sensor signal representing the physical parameter is sent to the warning device using the sending unit, which is fastened to the second portion of the wheel hub or the wheel rim of the wheel by means of the fastening device in the fastening position, in order to enable monitoring of the physical parameter.

This method can be implemented, for example, in software or hardware or in a mixed form of software and hardware, for example in a control unit.

BRIEF DESCRIPTION OF THE DRAWINGS

Exemplary embodiments of the approach presented here are shown in the drawings and explained in more detail in the following description.

FIG. 6 shows a perspective representation of a rear side of a transmission unit according to an embodiment;

FIG. 6a shows a perspective representation of a rear side of a transmission unit according to an embodiment;

FIG. 7 shows a perspective exploded view of a fastening device of a transmission unit according to an embodiment;

FIG. 9 shows a perspective illustration of a sensor unit of a monitoring device according to an embodiment;

FIG. 9a shows a perspective representation of a sensor unit according to an embodiment;

FIG. 10 shows a perspective illustration of an exemplary embodiment of a warning device for a vehicle;

FIG. 10a is a perspective view of a base station of a warning device according to an embodiment;

FIG. 11 shows an output unit for use with a warning system according to an embodiment;

FIG. 12 shows a schematic top view of a vehicle with a monitoring device according to an exemplary embodiment; FIG.

FIG. 12a shows a schematic side view of a vehicle with a monitoring device according to an embodiment;

DETAILED DESCRIPTION

In the following description of favorable exemplary embodiments of the present approach, the same or similar reference symbols are used for the elements which are shown in the various figures and have a similar effect, with a repeated description of these elements being dispensed with.

Figure 1:
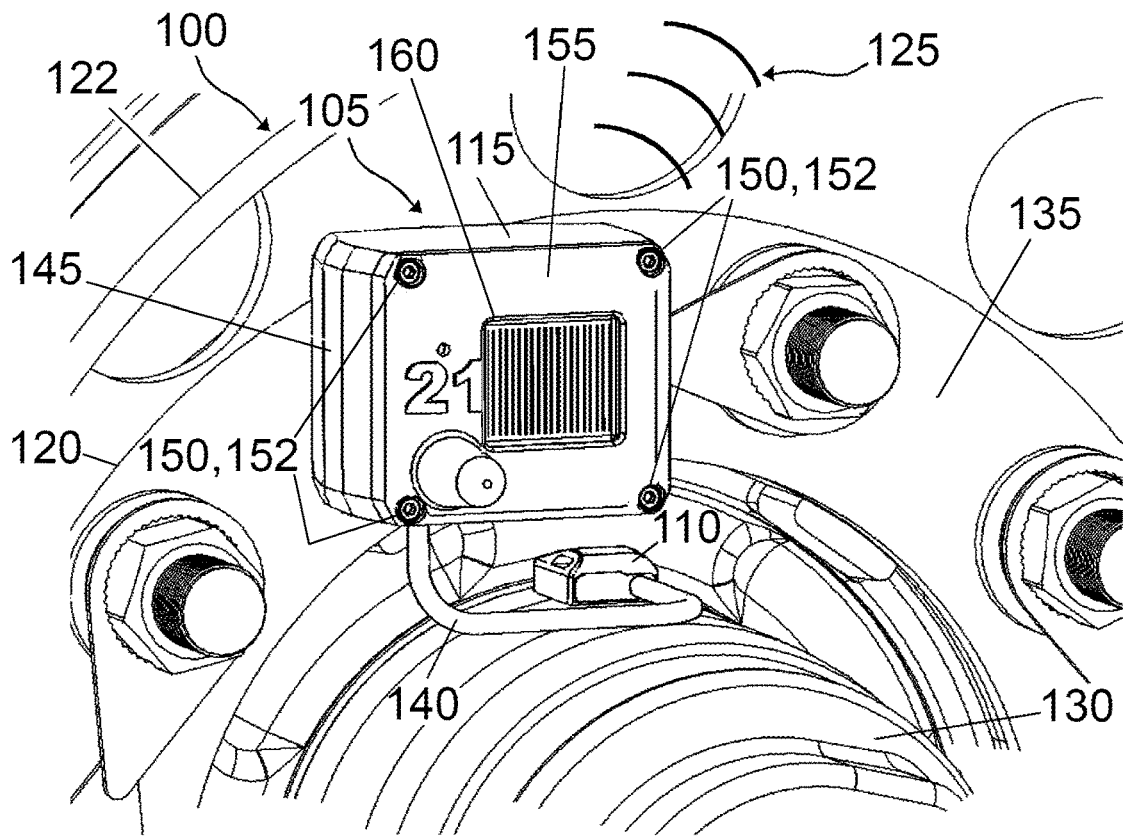
FIG. 1 shows a perspective representation of an exemplary embodiment of a monitoring device for a vehicle.

FIG. 1 shows a perspective illustration of an exemplary embodiment of a monitoring device 100 for a vehicle. The monitoring device 100 according to this embodiment is shown from a front side.

The monitoring device 100 has at least one measuring device 105 with a sensor unit 110 and a transmitter unit 115. Sensor unit 110 is designed to sense a physical parameter in the area of the wheel in a coupled position on a first section of a wheel hub 120 of a wheel of the vehicle while the vehicle is traveling. Transmitter unit 115 has a fastening device that is designed to fasten transmitter unit 115 in a fastening position to a second section of wheel hub 120 of the wheel or to a wheel rim 122, with transmitter unit 115 being designed to transmit a sensor signal representing the physical parameter 125 wirelessly to an alarm device to enable monitoring of the physical parameter.

The monitoring device 100 can be used for vehicles such as articulated lorries with, for example, several trailers and a large number of wheels, so-called "road trains", which cover long distances at potentially high outside temperatures. According to this exemplary embodiment, monitoring device 100 is mounted on wheel hub 120 in an operational state, with sensor unit 110 being coupled in the coupled position to the first section, which, according to this exemplary embodiment, is formed as a hub shell 130 of wheel hub 120, and transmitter unit 115 in the fastening position on the second portion, which is formed as a hub flange 135 of the wheel hub 120 according to this embodiment. The hub shell 130 is shaped to pass through a vehicle axle of the vehicle. According to this exemplary embodiment, the hub flange 135 extends radially away from the hub shell 130.

According to an alternative exemplary embodiment, the transmitter unit 115 is attached to the wheel rim 122 which is coupled to the wheel hub 120. According to this exemplary embodiment, transmission unit 115 is designed to transmit sensor signal 125 by radio to the warning device, which, according to one exemplary embodiment, is arranged or can be arranged in a driver's cab of the vehicle.

According to this exemplary embodiment, the transmission unit 115 and the sensor unit 110 are arranged in different housings and/or are connected to one another or are formed so as to be connectable via a flexible connection cable 140 for the transmission of the physical parameter.

According to this exemplary embodiment, connecting cable 140 in the form of a short cable leads from a housing base of a transmitter unit housing 145 of transmitter unit 115, which can also be referred to as a "warning unit", to sensor unit 110 in the form of a temperature probe, which, according to this exemplary embodiment, is attached to hub sleeve 130 of the wheel hub 120 adheres magnetically directly above an internal bearing. Merely by way of example, according to this exemplary embodiment, four screws 150 with housing nuts 152 close the transmitter unit housing 145 with, according to this exemplary embodiment, a solar cover 155 of the transmitter unit housing 145 in a gas-tight and/or pressurized water-tight manner with the aid of a seal 450 shown in FIG. 4.

According to this exemplary embodiment, measuring device 105 also has a solar module 160, which is designed to charge an energy storage device of measuring device 105 using solar energy in order to provide supply energy for operating measuring device 105, and/or a plug-in connection for external charging of the energy storage device. According to one exemplary embodiment, the energy storage device comprises at least one accumulator and/or is accommodated in transmission unit 115. According to this exemplary embodiment, the solar module 160, which can also be referred to as a "solar cell", and/or the plug connection are arranged on or in the transmission unit 115. According to this exemplary embodiment, transmission unit 115 is designed to send sensor signal 125 to the warning device with a transmission power of more than 100 mW and/or has a repeater to amplify sensor signal 125 and/or forward a second sensor signal. According to one embodiment, the repeater is designed to receive and amplify and/or forward the second sensor signal from a second measuring device structurally corresponding to measuring device 105, the second measuring device being further away from the warning device than the measuring device according to one embodiment 105.

The transmission unit 115 is thus designed according to this exemplary embodiment in order to send the sensor signals 125 to the warning device as considerably stronger radio signals than is otherwise customary in radio systems integrated in motor vehicles. Transmission unit 115 is additionally or alternatively designed to transmit sensor signal 125, which includes identification information that enables identification of measuring device 105 from another measuring device, and/or includes charge state information of the energy storage device of measuring device 105.

According to this exemplary embodiment, the sensor unit 110 has at least one magnet which is designed to magnetically couple the sensor unit 110 to the wheel hub 120, here to the hub sleeve 130.

According to one exemplary embodiment, the monitoring device 100 has at least the second measuring device or any number of further measuring devices 105.

The monitoring device 100 presented here can also be referred to as an "axle fire warning system" or "AFWS" for short. According to one exemplary embodiment, the AFWS warns of tire fires in good time and can be used for long road trains with, for example, more than one trailer behind a tractor, the so-called road trains, as are common in Australia, Brazil and the USA. The AFWS was primarily developed for vehicles transporting explosive hazardous goods in order to protect the life of the vehicle driver and any bystanders in the vicinity. The AFWS protects road trains of all lengths, regardless of the type of load being transported.

Multiple trailers are allowed on public roads in Australia and Brazil, two trailers are allowed in the US, while Germany only allows one trailer to be towed. In Australia, the large number of wheels on several trailers regularly leads to tire fires caused by an axle hub that has heated up to the point of glowing, usually as a result of a wheel brake malfunction.

A tire fire cannot be extinguished without cooling off with enough water. An attempt to put it out with the help of a fire extinguisher carried with you can smother the flames momentarily, but the hot metal of the axle, hub and rim will reignite the tire again and again due to the flammable gases that are produced by the smoldering tire material. Eventually, the entire truck bursts into flames.

When transporting general cargo, damage is settled by insurance. In the case of dangerous goods from explosive cargo, axis fire can end in disaster, especially if the cargo is mass explosive. So far, there is no functioning monitoring system for long road trains with several trailers, which informs the vehicle driver if one of the many wheels suddenly heats up and a spontaneous tire fire is imminent.

A tire fire is caused by a rubbing axle bearing, almost always caused by a suddenly closing brake. A single braking wheel is not noticed by the vehicle driver, as this low braking effect does not affect the driving behavior of a long truck.

The overheating of a wheel is only noticed by chance, but usually only when it is already too late. As a countermeasure, the vehicle is stopped at fixed time intervals, usually every two hours, and the temperature of the wheel hubs and rims is measured with an infrared thermotester. The measurement results are logged by hand.

Some road trains have a pressurized water tank and long hose installed which may successfully extinguish an axle fire if the driver is physically able to do so, relying only on himself. The Australian road trains are only manned by one person, the vehicle driver.

If the cargo is explosive, the dilemma arises between trying to put out the fire or getting away as quickly as possible to achieve a necessary safety distance. This minimum distance can be a kilometer or more if a mass explosion is imminent.

As practice has shown, a brake can malfunction at any time and trigger a braking process, even immediately after the wheels have been inspected and inspected. Continuous braking heats up the axle and the high temperatures destroy the lubrication in the axle bearing. The axle, including the wheel hub, inside which the wheel bearing is located, begins to glow and transfers the heat to the rim and the tire material via the hub flange. The resulting tire gases then ignite explosively. With an explosive cargo, the driver and a large part of the environment are in great danger.

In Australia, drivers travel alone, i.e. without a passenger. They spend hours crossing uninhabited and very remote parts of the country, often on gravel roads with very little traffic, and are responsible for almost all of the country's goods transport. Daytime temperatures reach 50 degrees Celsius in some areas. Being confronted with a tire fire under such conditions is hard to imagine.

The monitoring device 100 presented here now implements a system for road trains which protects against a tire fire. For this purpose, this effective monitoring device 100 continuously determines the physical parameters in the form of the respective hub temperature of the wheels and transmits this to the warning unit in order to warn the vehicle driver in good time of sudden overheating of an affected wheel, so that an extinguishing action is fundamentally prevented. The monitoring device 100 is also quickly and easily portable when the tags are arbitrarily changed.

A road train consists of a tractor, trailers, trailers and dollies. Since a temperature measurement using measuring units only makes sense directly on the wheels, namely on the rotating wheel hub 120, where the heat is generated at the inner bearing and spreads from there to the wheel rim 122, there is a fixed wiring to the driver's cab due to the rotating movement of the hub locked out. Data transmission therefore takes place in the monitoring device 100 via a radio link.

Road trains are more than fifty meters long and require a strong transmission power from the respective wheel to the warning device in the driver's cab, which is why the transmission power of the monitoring device 100 presented here advantageously reliably overcomes this distance and the shielding by the load, especially in curves. Furthermore, a necessary independent, maintenance-free and reliable power supply is implemented in the monitoring device 100 according to this exemplary embodiment.

In accordance with the logistics in a fleet operation with vehicles constantly changing among themselves, the axle fire warning system also advantageously allows the monitoring device 100 to be changed without any effort. The measuring device 105 is for this purpose can be disassembled/assembled quickly and easily when changing trailers and is not firmly attached to a wheel bolt thread, for example screwed.

Future integrated systems will find the detection when a trailer is docked in an electronic solution. The monitoring device 100 enables a variant that can be retrofitted in the form of a "plug and play" system, in which the measuring device 105 can be immediately switched from one wheel to another wheel in a matter of seconds.

For the transport of explosive dangerous goods, it is necessary that devices with their own power sources are explosion-proof, i. i.e. in an explosive atmosphere they must not represent a source of ignition. Only explosion-proof certified equipment can be used for hazardous materials that require special design features before they can be certified.

The AFWS is shown as an explosion-proof embodiment using a road train for dangerous goods. Since the technical designs of axles, hubs and rims in truck and trailer construction are subject to great variety, it is also necessary to develop an axle fire warning system whose transmitter unit/s 115 and sensor unit/s 110 can be docked to all truck wheels. This is implemented in the monitoring device 100 presented here.

Figure 2:
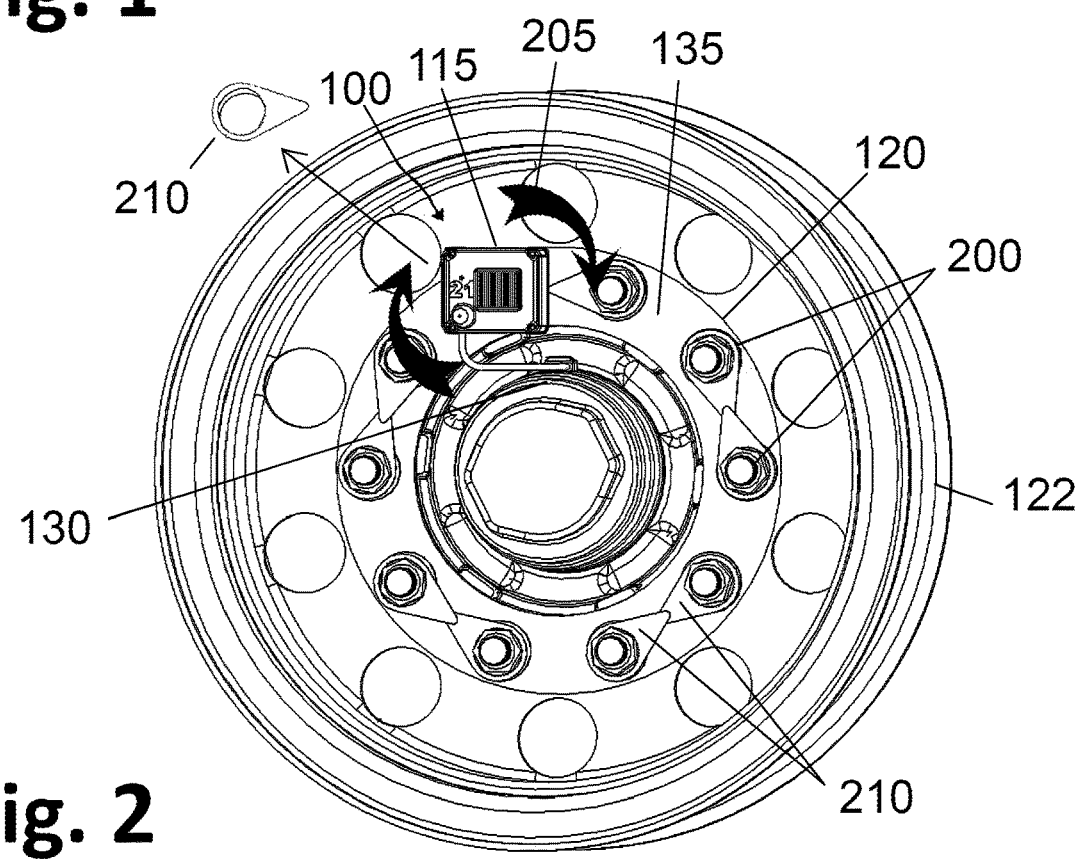
FIG. 2 shows a perspective illustration of an exemplary embodiment of a monitoring device for a vehicle.

FIG. 2 shows a perspective illustration of an exemplary embodiment of a monitoring device 100 for a vehicle. This can be the monitoring device 100 described with reference to FIG. 1, which, as described in FIG. 1, is mounted on the wheel hub 120 in the ready-to-operate state.

According to this exemplary embodiment, transmitter unit 115 is designed with one or more neodymium magnets and/or encloses a wheel nut 200 of wheel hub 120 or wheel rim 122 with the transmitter unit housing, and/or pulls itself magnetically over the steel of wheel nut 200. By about a quarter turn of the Transmitting unit 115 in the clockwise direction, shown here by the arrows 205, the transmitting unit housing of the transmitting unit 115 is jammed with the wheel nut 200 and can no longer be removed. Turning counterclockwise releases the jamming and the transmitter unit 115 can be removed after the magnetic force has been overcome.

According to this exemplary embodiment, the wheel nut indicator 210 located at this point is replaced by the transmitter unit 115.

Advantageously, the monitoring device 100 implements a ready-to-use, "plug and play" axle fire warning system that can be attached in seconds or removed immediately, with, according to one exemplary embodiment, a warning screen for the timely detection of imminent tire fires, in particular on long truck-trailers with multiple trailers and numerous wheels, the so-called Road trains, suitable for transporting explosive hazardous goods, explosion-proof for use in explosive atmospheres with the following features:

the transmitter unit 115, immediately adhering to, according to this embodiment, a single wheel nut 200 and according to this embodiment, magnetically adhering sensor unit 110, for example in the form of a temperature probe, on the wheel hub 120;

optionally, a separate, independent, self-charging power source integrated in the transmitter unit 115 for continuous temperature transmission of the hub and rim area through a powerful radio transmission to the warning device, for example in the form of a screen with a warning function in the driver's area; and optional remote query of the data from any geographic location via the Internet, when driving through or staying in areas covered by mobile communications.

According to this embodiment, the attachment of the transmitter unit 115 of the monitoring device 100 is achieved solely by adhesion to the hexagonal surfaces of a single wheel nut 200, thereby allowing a quick change of the monitoring device 100 from the wheel of a trailer to be detached to the wheel of a trailer to be hitched, and therefore an arbitrary exchange of trailers and towing vehicles with basically all types of truck trailer wheel rims.

Figure 3:
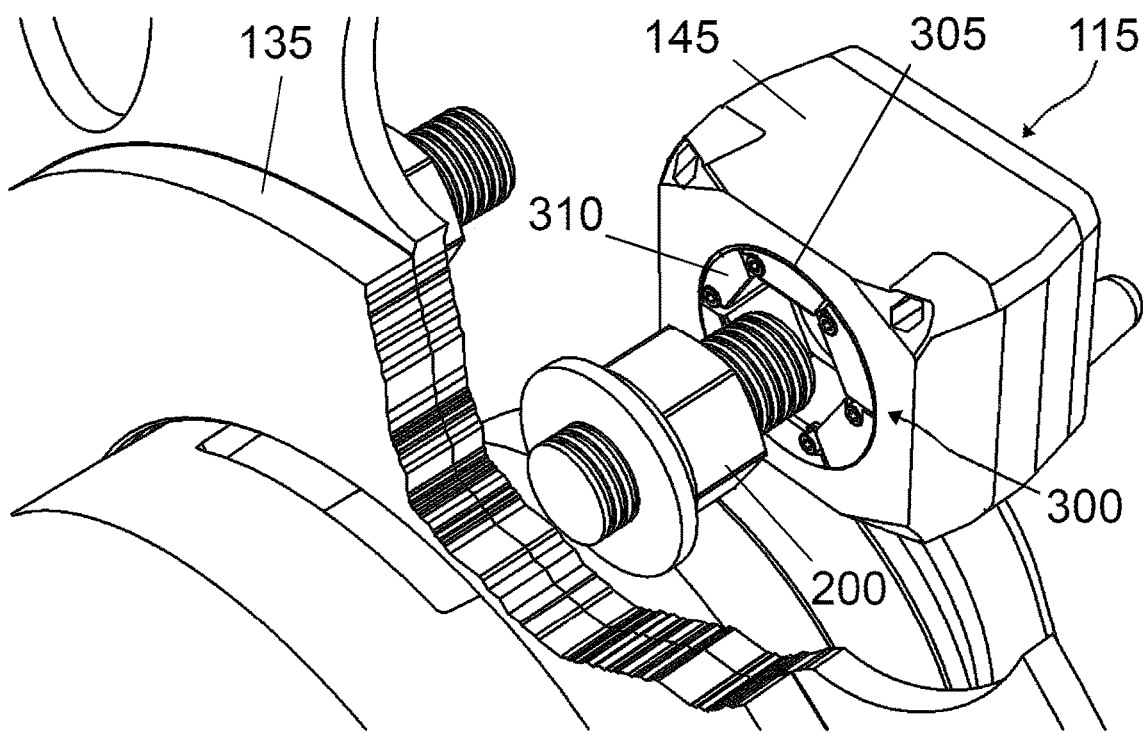
FIG. 3 shows a perspective illustration of a rear side of a transmission unit of a monitoring device according to an embodiment.

FIG. 3 shows a perspective representation of a rear side of a transmission unit 115 according to an exemplary embodiment. This can be an exemplary embodiment of the transmission unit 115 described in FIG. 1 or 2.

According to this exemplary embodiment, fastening device 300 of transmitter unit 115 is arranged on the rear of transmitter unit 115, here on the rear of transmitter unit housing 145, and/or has a recess which is formed for positively locking transmitter unit 115 on wheel nut 200 of the wheel hub of the wheel is. According to this exemplary embodiment, the wheel nut 200 is arranged on the hub flange 135 and/or the wheel rim. Additionally or alternatively, according to this exemplary embodiment, at least one area of fastening device 300 is formed magnetically in order to magnetically fasten transmitter unit 115 to wheel nut 200, hub flange 135, or to the wheel rim, and/or fastening device 300 has a clamping device 305 that is designed for this purpose is to clamp the transmitter unit 115 to the wheel nut 200, the hub flange 135 or the wheel rim. According to this exemplary embodiment, the clamping device 305, which can also be referred to as a "clamp socket", has a plurality of clamping claws 310, here for example six clamping claws 310.

Figure 4:
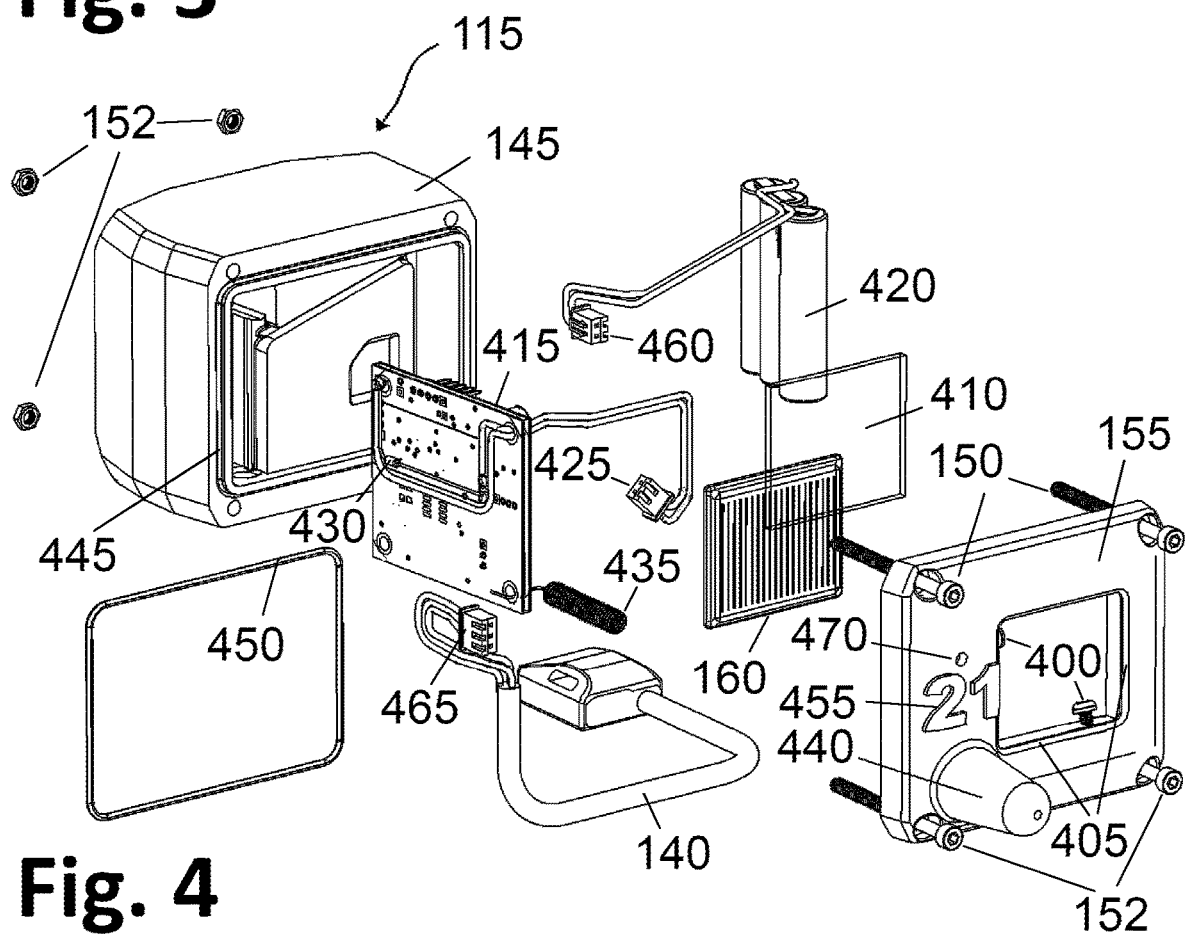
FIG. 4 shows a perspective exploded view of a front side of a transmission unit according to an embodiment.

FIG. 4 shows a perspective exploded view of a front side of a transmission unit 115 according to an embodiment. This can be an exemplary embodiment of the transmission unit 115 described in FIG. 1, 2 or 3.

According to this exemplary embodiment, two tapping screws 400 fix the solar module 160 in a window frame 405 of the solar cover 155 provided for this purpose. According to this exemplary embodiment, a protective pane 410 is located directly in front of the solar module 160 and is optionally welded into the window frame 405 in a watertight and airtight manner.

According to this exemplary embodiment, the open transmission unit housing 145 positions a circuit board 415, inserted on a left-hand side, and opposite it, inserted on the right according to this exemplary embodiment, the energy storage device in the form of an accumulator 420. According to this exemplary embodiment, a first plug 425 connects the solar module 160 to the circuit board 415. According to this exemplary embodiment, a diode 430 prevents a short circuit if the solar module 160 is damaged as a result of external influences.

According to this exemplary embodiment, an antenna spiral 435 slides into an antenna hat 440 extending away from the solar cover 155. According to this exemplary embodiment, a groove configuration 445 on the transmission unit housing 145 accommodates the seal 450, which ensures that the solar cover 155 is closed in a way that is safe from ignition sources.

A number 455, here with the numbering "21" as an example, on the solar cover 155 refers here as an example to wheel no. 21 on the second trailer on the left-hand side in FIG. 12.

According to one exemplary embodiment, even numbers refer to the wheels on the right-hand side of a road train, odd numbers to the wheels on the left-hand side. The rechargeable battery 420 is connected to the circuit board 415 via a second plug 460 and a fourth plug 500 shown in FIG. 5. A third plug 465 connects the connection cable 140, which can also be referred to as the "sensor cable", with the circuit board 415. A lens 470 made of light-conducting plastic material on the solar cover 155 can cause an LED 530 shown in FIG. 5 to light up briefly on the circuit board 415 be observed at a defined time interval, for example every 120 seconds, and serves as proof that the measuring device is in operation.

In order to achieve increased explosion protection, according to one exemplary embodiment, the entire inner cavity of the transmission unit 115 is encapsulated with casting compound. For this purpose, after the transmitter unit 115 has been assembled, the encapsulation compound can be injected via one or two holes in the antenna hat 440 that have to be re-drilled, if increased explosion protection is required.

The rechargeable battery 420 integrated into the transmitter unit 115 according to this exemplary embodiment serves as an independent power source with continuous charging through the integrated solar cell for continuous use of the monitoring device, which is in constant rotation while the vehicle is in motion. According to this exemplary embodiment, the transparent protective pane 410 protects the solar module 160 from mechanical damage protection, which is a prerequisite for an explosion protection certification.

Figure 4A:
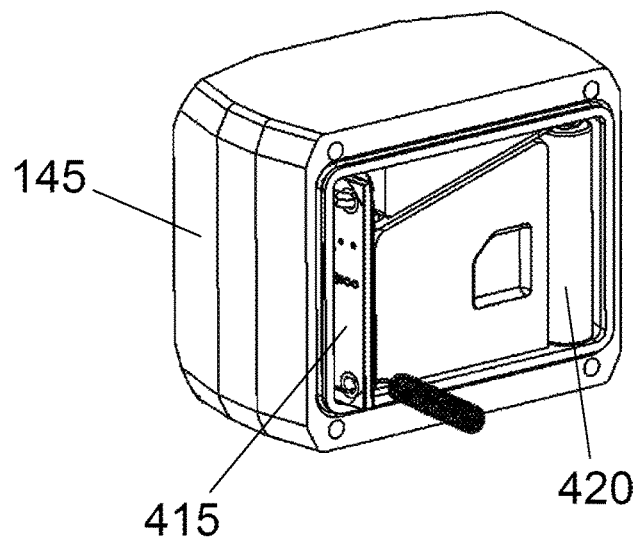
FIG. 4a shows a perspective representation of a front side of an opened transmission unit according to an exemplary embodiment.

FIG. 4a shows a perspective representation of a front side of an opened transmission unit 115 according to an exemplary embodiment. This can be the transmitter unit 115 described in FIG. 4 in the assembled state, with the solar cover not being shown to better illustrate an interior of the transmitter unit 115.

Figure 5:
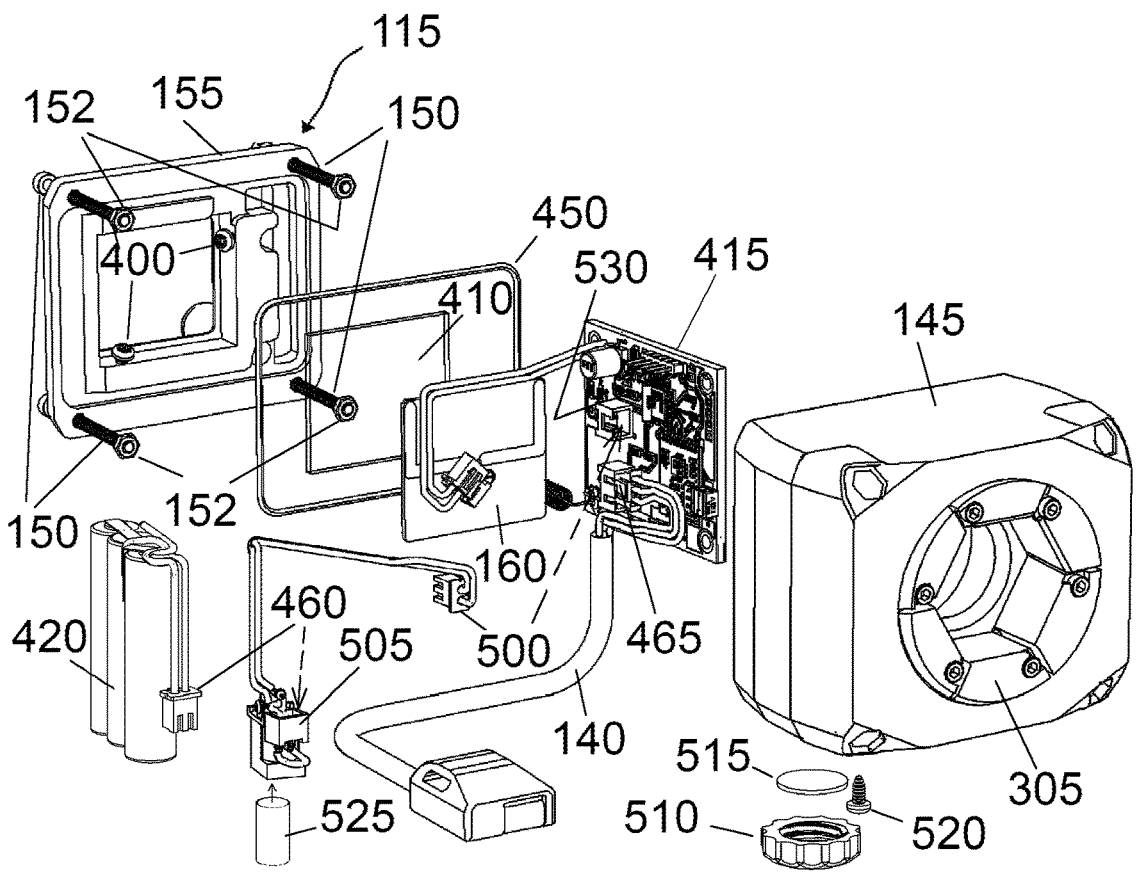
FIG. 5 shows a perspective exploded view of a rear side of a transmission unit according to an embodiment.

FIG. 5 shows a perspective exploded view of a rear side of a transmission unit 115 according to an embodiment. This can be the transmission unit 115 described in FIG. 4.

According to this exemplary embodiment, the rechargeable battery 420 is connected to the circuit board 415 with the second plug 460 and a fourth plug 500. According to this exemplary embodiment, the 3.2 volt and 600 mAh NiMH accumulator 420 can be charged quickly via the plug connection 505 in the form of a charging socket if the transmission unit 115 has not been exposed to a light source for a long time. The state of charge of the accumulator 420 can also be measured at the charging socket. According to one exemplary embodiment, a storage capacity of the accumulator 420 lasts for several months in the sleep mode. As soon as the transmitter unit 115 receives enough light, the accumulator 420 is charged. A quick charge and voltage measurement can be carried out via the charging socket.

According to this exemplary embodiment, a screwable closure cap 510 closes access to the charging socket in a gas-tight and/or pressurized-water-tight manner by means of an embedded sealing disk 515. According to this exemplary embodiment, an independent loosening of the closure cap 510 on the thread is prevented by a locking screw 520, the screw head of which turns between ribs of the closure cap 510, see also FIG. 6a.

As soon as the measuring device is assembled as shown in FIG. 1, it starts to work in the sleep mode. Due to the explosion protection, the measuring device does not have its own switch to interrupt the current circuit. In order to interrupt the circuit during storage or during shipping, a sleeve 525 is pushed into the charging socket, which interrupts the typical circuit-closing spring contact of these commercially available sockets.

According to this exemplary embodiment, the LED 530 on the circuit board 415 lighting up can be observed at a defined time interval, for example every 120 seconds, and serves as proof that the measuring device is in operation.

FIG. 6 shows a perspective illustration of a rear side of a transmission unit 115 according to an exemplary embodiment. This can be the transmission unit 115 described in one of the previous figures.

Shown is the transmission unit housing 145 of the transmission unit 115 with the clamping device 305 completely screwed in according to this exemplary embodiment. If the clamping device 305 is completely screwed in, a maximum clamping effect is achieved. According to this exemplary embodiment, the recess is implemented as a hexagon socket 600, which can also be referred to as a "hexagonal hole recess".

The locking screw 520, washer 515 and cap 510 are shown in an exploded view according to this embodiment.

FIG. 6a shows a perspective representation of a rear side of a transmission unit 115 according to an exemplary embodiment. This is the transmission unit 115 described in FIG. 6, in which the locking screw 520, sealing washer 515 and closure cap 510 are arranged in an assembled state. When installed, the locking screw 520 prevents the closure cap 510 from being unscrewed in a form-fitting manner between two ribs of the closure cap 510.

FIG. 7 shows a perspective exploded view of a fastening device 300 of a transmission unit 115 according to an exemplary embodiment. This can be the transmission unit 115 described in FIG. 6a.

The clamping device 305 removed from the transmission unit housing 145 is shown in its individual components, which are held together with six additional screws 700 and their locking nuts 705. A cylindrical threaded part 710 has the hexagonal central hole recess parallel to a cylinder axis 715, which corresponds to the width across flats of one of the wheel nuts 200 shown in FIGS. 1 and 2.

The screwed-in clamping device 305 that matches the respective wheel nut wrench size of the wheel nuts 200 is equipped with a further magnet 720 within each clamping claw 310, here for example a total of six neodymium magnets with six clamping claws 310. A magnet chamber cover 725 closes the magnet chamber in each of the six clamping claws 310.

The other magnets 720 prevent the transmitter unit 115 from falling off the wheel nut if the clamping effect has been forgotten by a person who has turned it additionally, which can easily happen in a hurry, e.g. B. when changing a trailer. The magnetic force alone is perfectly sufficient to hold the transmitter unit 115 firmly on the wheel nut while driving. The clamping mechanism is an additional mechanical security and also protects against theft if necessary.

Figure 8:
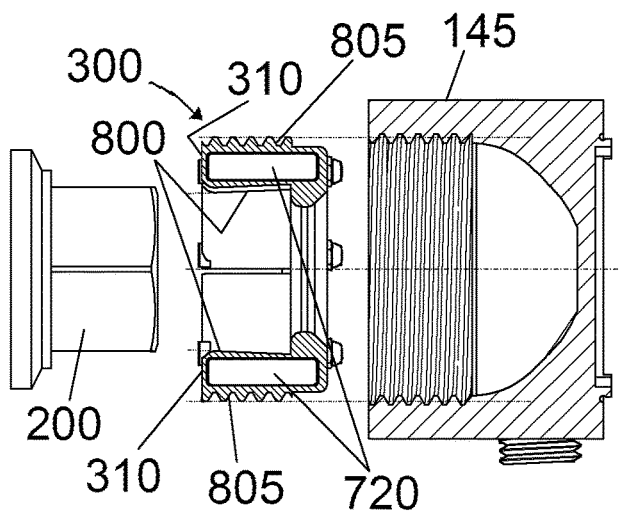
FIG. 8 shows a lateral cross-sectional illustration of a fastening device of a transmission unit according to an exemplary embodiment.

FIG. 8 shows a lateral cross-sectional illustration of a fastening device 300 of a transmission unit according to an exemplary embodiment. This can be the fastening device 300 described in FIG. 7.

According to this exemplary embodiment, the wheel nut 200 is shown outside of the clamping claws 310. According to this embodiment, flat inner walls 800 of the clamping claws 310 incline toward the cylinder axis. As a result, the wall thickness of the clamping claws 310 thickens in the direction of the hub flange.

When the cylindrical threaded portion 710 is slid over the wheel nut 200, the six clamping claws 310 are spread apart to enclose the wheel nut 200. The clamping effect arises from the fact that a cylindrical external thread 805 of the clamping claws 310 is formed conically by being pushed onto the wheel nut 200 as a result of the spreading apart, since the inner walls 800 of the clamping claws 310 adapt to the hexagonal surfaces of the wheel nut 200. The conical external thread is shown in FIG. 8a.

Figure 8A:
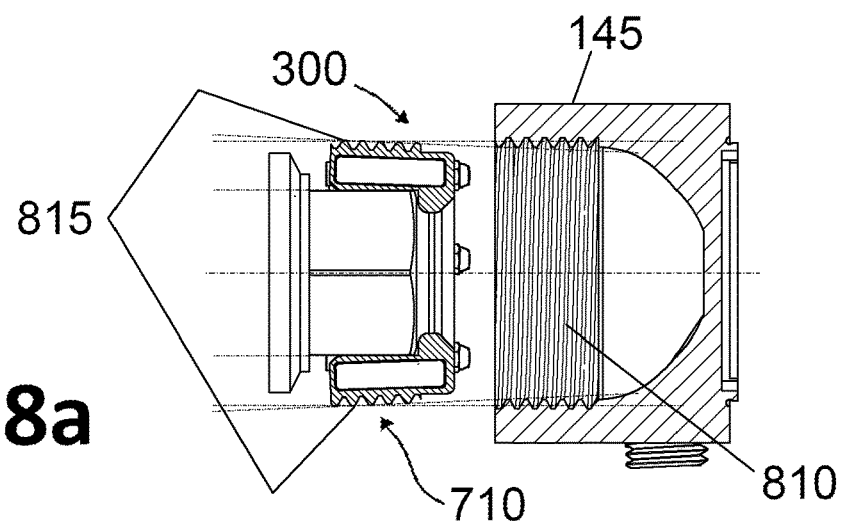
FIG. 8a shows a lateral cross-sectional illustration of a fastening device of a transmission unit according to an embodiment.

FIG. 8a shows a lateral cross-sectional illustration of a fastening device 300 of a transmission unit according to an exemplary embodiment. This can be the fastening device 300 described in FIG. 8, in which the wheel nut 200 is shown in a completely inserted, ie clamped, state into the clamping claws.

If the transmission unit housing 145 is screwed with its cylindrical internal thread 810 onto the now conical external thread 815, the hexagonal hole recess, which is shown in FIG. 6, narrows increasingly with each rotation. The pressure of the surfaces on each other finally becomes so great that it is impossible to pull the transmission unit housing 145 off the wheel nut 200 without turning it back.

Figure 8B:
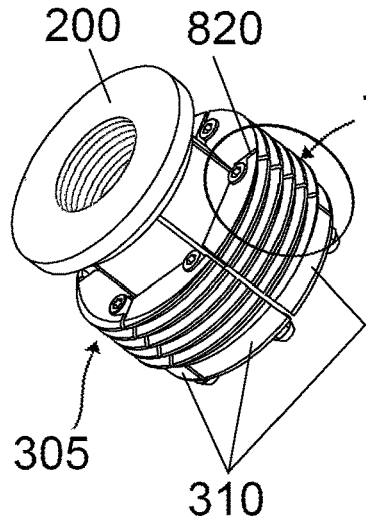
FIG. 8b shows a perspective illustration of a clamping device of a transmission unit according to an exemplary embodiment.

FIG. 8b shows a perspective representation of a clamping device 305 of a transmission unit according to an exemplary embodiment. This can be the clamping device 305 described in FIG. 8 or 8a.

The wheel nut 200 is shown partially inserted into the clamp jaws 310. The threaded part 710 is slotted on six inner edges by incisions 820, so that the six clamping claws 310 are formed, which remain connected to one another at the screwed-in end.

According to this exemplary embodiment, the screw-in, exchangeable clamping device 305, which matches the wrench size of wheel nut 200, allows the transmitter unit to be quickly attached and detached, according to this exemplary embodiment, with clamping device 305 exerting a primary magnetic clamping adhesion on wheel nut 200 in the clamped state and As a result of a thread-tightening rotational movement on the transmission unit housing, see also FIG. 2, a secondary mechanical clamping effect is generated, which already additionally reinforces and at the same time secures the magnetic clamping force that is already sufficient for mounting.

Figure 8C:
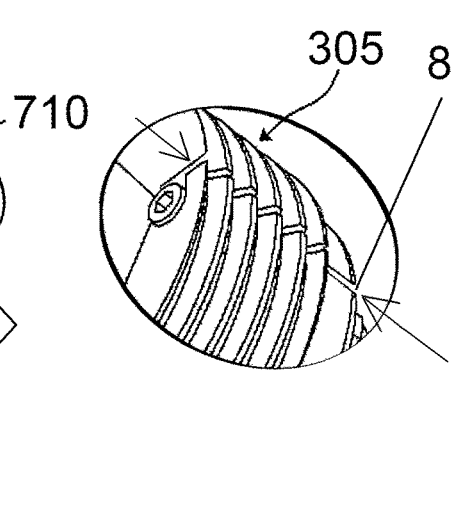
FIG. 8c shows a perspective view of a section of a clamping device according to an embodiment.

FIG. 8c shows a perspective view of a section of a clamping device 305 according to an exemplary embodiment. This can be a section of the clamping device 305 described in FIG. 8b, which shows one of the incisions 820 in more detail.

Figure 8D:
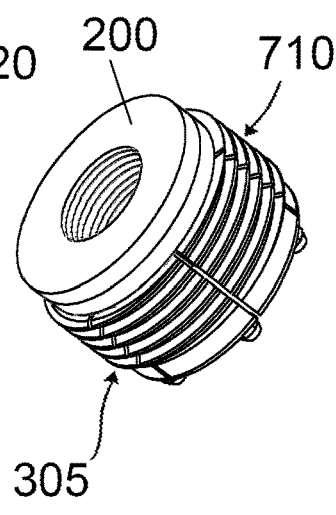
FIG. 8d shows a perspective illustration of a clamping device of a transmission unit according to an exemplary embodiment.

FIG. 8d shows a perspective view of a clamping device 305 of a transmission unit according to an exemplary embodiment. This can be the clamping device 305 described in FIG. 8b, the wheel nut 200 being shown in a completely inserted, ie clamped, state into the clamping claws.

FIG. 9 shows a perspective representation of a sensor unit 110 of a monitoring device according to an exemplary embodiment. This can be the sensor unit 110 described in FIG. 1, 4 or 5.

According to this exemplary embodiment, sensor unit 110 is in the form of a temperature probe, which is designed to sense a temperature as the physical parameter and/or, according to an alternative exemplary embodiment, has a pressure sensor to sense tire pressure as the physical parameter.

According to this exemplary embodiment, the temperature probe comprises a programmable temperature sensor 900, a copper angle plate 905, the magnet 910 in the form of a neodymium magnet, a sensor housing 915 and/or a casting compound 920. According to this exemplary embodiment, the sensor housing 915 is designed with a hole recess, which can be seen in FIG. 1. An optional cable tie can be pulled through the hole.

The temperature is sensed via the copper angle plate 905, which, according to this exemplary embodiment, absorbs the heat via one or both of two surfaces 925, 930 angled at 90 degrees to one another and transmits it to the temperature sensor 900. According to this exemplary embodiment, the temperature sensor 900 is surrounded by an eyelet formation 935 of the angle plate 905 and is cast, including a cable end 940 of the connecting cable 140, together with the neodymium magnet 910 in the sensor housing 915 with the casting compound 920.

FIG. 9a shows a perspective view of a sensor unit 110 according to an embodiment. This can be the sensor unit 110 described in FIG. 9, which is shown rotated 90° clockwise.

FIG. 10 shows a perspective illustration of an exemplary embodiment of a warning device 1000 for a vehicle. This can be the warning device 1000 described in FIG. 1.

Warning device 1000 is designed to read in the sensor signal of one of the monitoring devices described in one of the preceding figures and, using the sensor signal, to cause the physical parameter to be output optically, acoustically and/or haptically on an output unit shown in FIG. 11, for example.

According to this exemplary embodiment, the warning device 1000 is also designed to generate a warning signal when the physical parameter reaches or exceeds a defined threshold value. According to one exemplary embodiment, the defined threshold value represents a maximum temperature of, for example, 75° C. at the wheel hub. According to one exemplary embodiment, the warning signal is designed to cause an acoustically, visually and/or haptically perceptible warning for a person on the output unit, for example. Furthermore, according to one exemplary embodiment, warning device 1000 is designed to generate a further warning signal when the state of charge information reaches or falls below a defined state of charge threshold value, wherein the defined state of charge threshold value according to one exemplary embodiment represents a low battery level or one that needs charging, for example 20 percent of the charging capacity of the energy storage device.

A system of the warning device 1000 and the monitoring device can also be referred to as a warning system.

According to this exemplary embodiment, the warning device 1000 has a base station 1005, a base station plug 1007 and/or a further antenna 1010.

As soon as the base station 1005 receives a 12 V vehicle current from the car socket from the car battery and the driver has switched on the output unit, for example in the form of a tablet shown in FIG. 11, the warning system begins to work, recognizable according to this embodiment Further LEDs 1015 and/or additional LEDs 1020 light up. According to this exemplary embodiment, the software of the base station 1005 is booted after about two minutes, at the same time, according to this exemplary embodiment, a modem 1025 is initialized inside the base station 1005 and, according to this exemplary embodiment, connects to the output unit via WiFi.

If the base station 1005 in the driver's cab is switched off by pulling out the base station plug 1007, here in the form of a 12 volt universal plug, the transmission units on all the wheels shown in FIGS. 2 and 12, for example, go into sleep mode. The radio contact of all transmission units via their antennas with the additional antenna 1010, which is arranged, for example, on the roof of the driver's cab, is then established. As soon as the base station plug 1007 is reinserted into the 12 volt vehicle socket, the warning system starts up.

A sample operation of the warning system is described below:

According to one embodiment, all transmission units of the monitoring device simultaneously transmit the current temperature to the base station 1005 via their antennas to the additional antenna 1010 at preprogrammed time intervals, for example every 2 minutes. According to this embodiment, the measurement is carried out at the request of the base station 1005 in the preprogrammed default time interval of two minutes by the temperature probe described in FIG. 9, which adheres to a heat-critical hot spot on the wheel hub by magnetic force. The modem 1025 in the base station 1005 forwards this data to the output unit. The software processes the data and displays them graphically and in various, easily understandable evaluation representations on the output unit, for example on a tablet screen.

If the measured temperature of any of the measuring devices exceeds the preprogrammed permissible value, for example 75° C., a first acoustic alarm is triggered and the alarm-triggering wheel and/or its measured data appear on the screen. The driver now has enough time to stop the vehicle in a safe place and take a look. However, if the wheel quickly continues to heat up, according to one exemplary embodiment, a second aggressive acoustic alarm sounds, specifically at a default temperature of 85° C., for example. A stop is urgently needed from this point on.

According to one exemplary embodiment, the software stores all measured values that go back far into the past and creates a measured value profile for each individual wheel over this period. These stored data are advantageous for the maintenance of the wheel bearings. According to one embodiment, the measuring devices detect not only a temperature increase which comes from the hub, but also a temperature increase which is caused by the rim, e.g. B. from an under-inflated tire. In the case of steer axle wheels, a tire bursting is particularly dangerous and is indicated by the heating of the tire material. For steer axle wheels it is therefore advisable to program the alarm trigger value low.

If the AFWS is located in an area covered by mobile communications, all current and historical AFWS data can be accessed geographically from anywhere according to one exemplary embodiment via the Internet by logging into the software.

In summary, the base station 1005 is designed according to this exemplary embodiment to forward the received physical parameters to a commercially available tablet screen, which transmits the temperature status of the wheels to the driver in an easily understandable manner and warns him acoustically, visually and/or haptically of an impending fire hazard in good time and/or points out the wheel from which a tire fire is imminent.

FIG. 10a shows a perspective representation of a base station 1005 of a warning device according to an embodiment. According to this exemplary embodiment, an interior of the base station 1005 described in FIG. 10 is shown.

FIG. 11 shows an output unit 1100 for use with a warning system according to an embodiment. This can be the warning system described in FIG. 10.

According to this exemplary embodiment, the output unit 1100 is arranged in a driver's cab of the vehicle, adjacent to a driver of the vehicle. According to one exemplary embodiment, the output unit 1100 is part of the warning system or, according to an alternative exemplary embodiment, is in the form of a communication device that is already present in the vehicle.

According to this exemplary embodiment, the output unit 1100 has a display, loudspeaker and/or mobile device, for example a device capable of vibrating. According to this exemplary embodiment, the output unit 1100 uses a plurality of sensor signals to display a plurality of temperatures for a plurality of wheels of the vehicle, each of which is equipped with measuring devices.

According to an alternative embodiment, using the sensor signals, a current state of charge of each individual battery of the monitoring device is also displayed on the output unit 1100 and/or an acoustic signal sounds and/or an optical signal appears if the state of charge of a rechargeable battery becomes questionable, for example only 20 percent of its charge capacity or less.

In other words, FIG. 11 shows a right-hand drive road train driver's cab with an output unit 1100 in the form of an AFWS tablet screen.

FIG. 12 shows a schematic top view of a vehicle 1200 with a monitoring device according to an exemplary embodiment. This can be the monitoring device described in one of the previous figures.

According to this exemplary embodiment, the monitoring device has at least one second measuring device with a second sensor unit, which is designed to measure a second physical parameter in the region of the to sense the second wheel, and having a second transmitter unit which has a second fastening device which is shaped in order to fasten the second transmitter unit in a fastening position to a second section of the wheel hub or a second wheel rim of the second wheel, the second transmitter unit is designed to wirelessly send a second sensor signal representing the second physical parameter to the warning device in order to enable monitoring of the second physical parameter. According to this exemplary embodiment, the monitoring device has a further measuring device of this type on each of, for example, 44 wheel hubs of 44 wheels.

In other words, FIG. 12 shows a road train with warning device placements.

The vehicle 1200 is formed according to this embodiment as a typical 53.5 meter long road train for ammonium nitrate, dangerous goods of transport class 5.1, consisting of six vehicle parts with continuous numbering of 44 wheels, with the right-hand wheel no. 34 on the penultimate trailer according to this Embodiment by sudden heating from normal 45° C. to 75° C. in the warning device just triggers the warning signal 1205 in the form of a first default alarm in the driver's cab. According to one exemplary embodiment, when the temperature rises to 85° C., a second warning signal in the form of a second default alarm is triggered in the driver's cab, which is signaled as an even more urgent alarm level.

FIG. 12a shows a schematic side view of a vehicle 1200 with a monitoring device according to an embodiment. This can be the vehicle 1200 described in FIG. 12.

Figure 13:
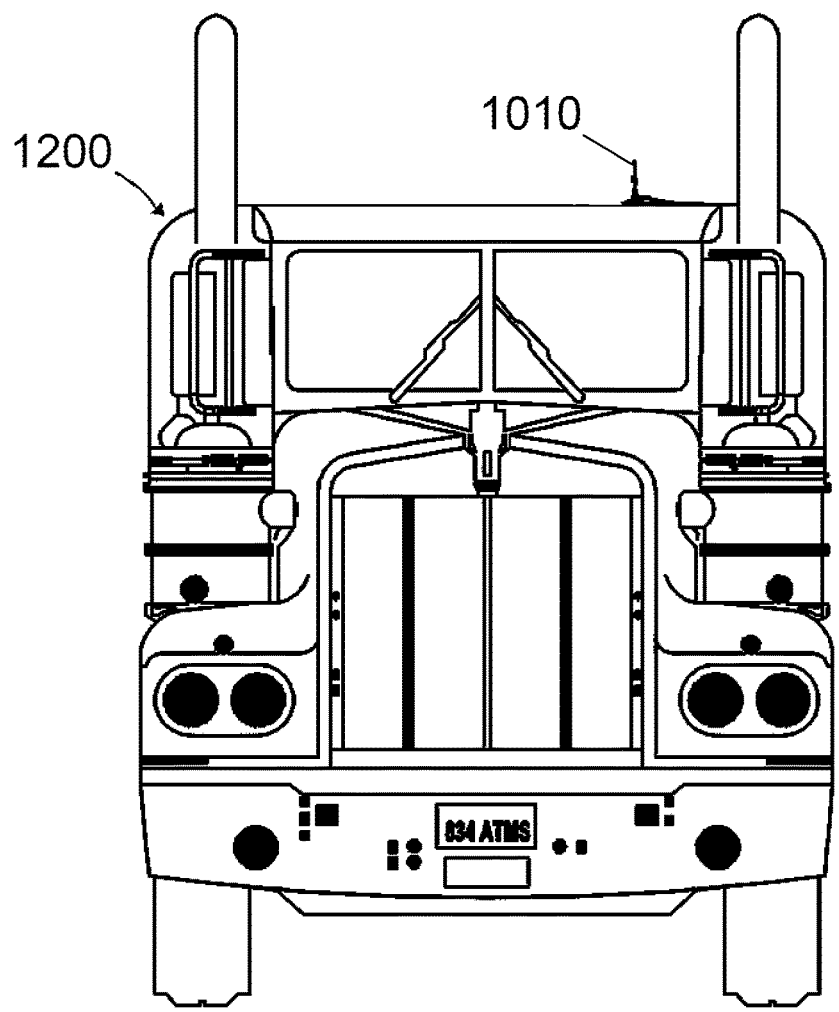
FIG. 13 shows a schematic illustration of a vehicle with a warning system according to an exemplary embodiment.

FIG. 13 shows a schematic representation of a vehicle 1200 with a warning system according to an exemplary embodiment. This can be the warning system described in FIG. 10. Vehicle 1200 is shown in front view.

According to this exemplary embodiment, the further antenna 1010 is positioned on a roof of the vehicle 1200, which, according to this exemplary embodiment, is designed as a road train towing vehicle.

Figure 14:
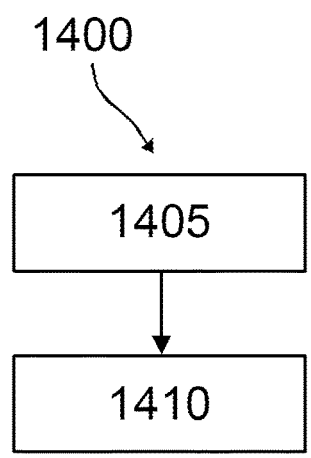
FIG. 14 shows a flowchart of a method according to an embodiment for operating a monitoring device.

FIG. 14 shows a flow chart of a method 1400 according to an embodiment for operating a monitoring device. This can be one of the monitoring devices described in one of the previous figures.

The method 1400 includes a step 1405 of sensing and a step 1410 of sending. In step 1405 of sensing, the physical parameter in the area of the wheel is sensed using the sensor unit in the coupled position on the first portion of the wheel hub of the wheel of the vehicle while the vehicle is running. In step 1410 of sending, a sensor signal representing the physical parameter is sent to the warning device using the transmitter unit, which is attached by means of the attachment device in the attachment position to the second portion of the wheel hub or the wheel rim of the wheel to enable monitoring of the physical parameter.

The method steps presented here can be repeated and carried out in a different order than the one described.

If an embodiment includes an "and/or" link between a first feature and a second feature, this should be read in such a way that the embodiment according to one embodiment includes both the first feature and the second feature and according to a further embodiment either only that having the first feature or only the second feature.

REFERENCE LIST 100 monitoring device
105 measuring device
110 sensor unit
115 transmission unit
120 wheel hub
122 wheel rim
125 sensor signal
130 hub shell
135 hub flange
140 flexible connection cable
145 transmitter housing
150 screw
152 housing nut
155 solar cover
160 solar panel
200 wheel nut
205 arrow
210 wheel nut indicator
300 fastener
305 clamping device
310 clamping claw
400 tapping screw
405 window frames
410 protective disk
415 circuit board
420 rechargeable battery
425 first plug
430 diodes
435 antenna spiral
440 antenna hat
445 groove formation
450 seal
455 numbering
460 second plug
465 third connector
470 lens
500 fourth plug
505 plug connector
510 locking cap
515 sealing washer
520 locking screw
525 sleeve
530 LEDs
600 hex socket
700 more screw
705 stop nut
710 threaded part
715 cylinder axis
720 further magnet
725 magnet chamber cover
800 inner wall
805 cylindrical male thread
810 straight female thread
815 tapered male thread
820 incision
900 temperature sensor
905 angle plate
910 magnet
915 sensor housing
920 potting compound
925 surface horizontal
930 further surface vertical
935 eyelet formation
940 cable end
1000 warning device
1005 base station
1010 additional antenna
1015 further LED
1020 additional LED
1025 modem
1100 output unit
1200 vehicle
1205 warning signal
1400 method of operating a monitoring device
1405 step of sensing
1410 step of sending

The invention claimed is:

1. A monitoring device (100) for a vehicle (1200), wherein the monitoring device (100) includes a measuring device (105) comprising:

a sensor unit (110) which is designed to sense a physical parameter in an area of a wheel of the vehicle (1200) in a coupled position on a first section of a wheel hub (120) of the wheel of the vehicle (1200) while the vehicle (1200) is traveling; and a transmitter unit (115), which has a fastening device (300) which is shaped in order to fasten the transmitter unit (115) in a fastening position on a second section of the wheel hub (120) of the wheel or a wheel rim (122), the transmitter unit (115) being designed to wirelessly send a sensor signal (125) representing the physical parameter to a warning device (1000) in order to enable the physical parameter to be monitored.

2. The monitoring device (100) according to claim 1, wherein the fastening device (300) has a recess which is formed for form-fitting fastening of the transmitter unit (115) on a wheel nut (200) of the wheel hub (120) of the wheel.

3. The monitoring device (100) according to claim 1, wherein at least a portion of the fastening device (300) is formed magnetically in order to magnetically fasten the transmitter unit (115) to the second section or to the wheel rim (122) or a wheel nut (200) and/or wherein the fastening device (300) has a clamping device (305) which is designed to clamp the transmitter unit (115) to the second section or the wheel rim (122) or wheel nut (200).

4. The monitoring device (100) according to claim 1, wherein the transmitter unit (115) is designed to send the sensor signal (125) to the warning device (1000) with a transmission power of more than 100 mW and/or wherein the transmitter unit (115) has a repeater in order to amplify the sensor signal (125) and/or to forward a second sensor signal.

5. The monitoring device (100) according to claim 1, wherein the transmitter unit (115) is designed to transmit the sensor signal (125) which comprises
identification information which enables the measuring device (105) to be identified by another measuring device and/or
charge status information of an energy storage device of the measuring device (105).

6. The monitoring device (100) according to claim 1, wherein the transmitter unit (115) and the sensor unit (110) are arranged in different housings (145; 915) and/or are connected to one another via a flexible connecting cable (140) for transmission of the physical parameter or are designed to be connectable, and/or wherein the transmitter unit (115) and/or the sensor unit (110) are arranged in a gas-tight and/or explosion-proof housing (145; 915).

7. The monitoring device (100) according to claim 1, wherein the measuring device (105) has
a solar module (160) which is designed to charge an energy storage device of the measuring device (105) using solar energy in order to supply energy for operating the measuring device (105) to provide, and/or
a plug connector (505) for external charging of the energy storage device.

8. The monitoring device (100) according to claim 1, wherein the sensor unit (110) comprises at least one magnet (910) which is adapted to magnetically couple the sensor unit (110) to the wheel hub (120) of the wheel.

9. The monitoring device (100) according to claim 1, wherein the sensor unit (110) comprises
a temperature probe (900) which is adapted to sense a temperature as the physical parameter and/or
a pressure sensor to sense to sense a tire pressure as the physical parameter.

10. The monitoring device (100) according to claim 1, further comprising
at least one second measuring device with a second sensor unit which is designed to be in a coupled position on a first section of a second wheel hub of a second wheel of the vehicle (1200) and to sense a second physical parameter in the area of the second wheel while the vehicle (1200) is traveling, and
a second transmitter unit, which has a second attachment device, which is shaped to attach the second transmitter unit to a second section of the second wheel hub or a second wheel rim of the second wheel,
wherein the second transmission unit is designed to wirelessly transmit a second sensor signal wirelessly representing the second physical parameter to the warning device (1000) in order to enable monitoring of the second physical parameter.

11. A system, comprising:
the monitoring device (100) according to claim 1; and
a warning device (1000) for a vehicle (1200), wherein the warning device (1000) is designed to read in the sensor signal (125) of the monitoring device (100) and use the sensor signal (125) to generate an optical, acoustic and/or haptic output of the physical parameter on an output unit (1100).

12. The system according to claim 11, wherein the warning device is designed to generate a warning signal (1200) when the physical parameter reaches or exceeds a defined threshold value.

13. A method (1400) for operating a monitoring device (100), comprising
the following steps:
providing the system according to claim 11;
sensing (1405) the physical parameter in the area of the wheel using the sensor unit (110) in the coupled position on the first section of the wheel hub (120) of the wheel of the vehicle (1200) while the vehicle (1200) is running; and
transmitting (1410) the sensor signal (125) representing the physical parameter to the warning device (1000) using the transmitter unit (115) which, by means of the fastening device (300) in the fastening position, is on the second section of the wheel hub (120) or the wheel rim (122) of the wheel is fixed to allow monitoring of the physical parameter.

* * * * *